(12) United States Patent
Kikuhara et al.

(10) Patent No.: US 10,157,603 B2
(45) Date of Patent: Dec. 18, 2018

(54) NOISE DETECTOR AND SOUND SIGNAL OUTPUT DEVICE

(71) Applicant: AUDIO-TECHNICA CORPORATION, Tokyo (JP)

(72) Inventors: Yasuhito Kikuhara, Tokyo (JP); Kazuhiro Onizuka, Tokyo (JP); Toru Aikawa, Chiba (JP)

(73) Assignee: AUDIO-TECHNICA CORPORATION, Tokyo (JP)

( * ) Notice: Subject to any disclaimer, the term of this patent is extended or adjusted under 35 U.S.C. 154(b) by 0 days.

(21) Appl. No.: 15/738,832

(22) PCT Filed: Oct. 28, 2016

(86) PCT No.: PCT/JP2016/082022
§ 371 (c)(1),
(2) Date: Dec. 21, 2017

(87) PCT Pub. No.: WO2017/158905
PCT Pub. Date: Sep. 21, 2017

(65) Prior Publication Data
US 2018/0197525 A1    Jul. 12, 2018

(30) Foreign Application Priority Data

Mar. 17, 2016 (JP) ................ 2016-054380

(51) Int. Cl.
*G10K 11/175* (2006.01)
*H04R 3/00* (2006.01)
(Continued)

(52) U.S. Cl.
CPC .......... *G10K 11/175* (2013.01); *G10L 15/005* (2013.01); *G10L 21/0208* (2013.01);
(Continued)

(58) Field of Classification Search
None
See application file for complete search history.

(56) References Cited

U.S. PATENT DOCUMENTS

2012/0020495 A1* 1/2012 Sekiya ................ G10L 21/0208
381/94.3

FOREIGN PATENT DOCUMENTS

| JP | 2006-83391 A | 3/1994 |
| JP | 2007-044996 A | 2/1995 |
| JP | 2012-027186 A1 | 2/2012 |

OTHER PUBLICATIONS

International Search Report from PCT/JP2016/082022.

* cited by examiner

*Primary Examiner* — Antim G Shah
(74) *Attorney, Agent, or Firm* — W & C IP

(57) ABSTRACT

A noise detector and a sound signal output device are provided that can detect high accuracy various types of noise including composite noise. The noise detector (30) for detecting noise contained in an input signal (s1) includes a noise discrimination portion having a plurality of discrimination portions to which an input signal is input and a noise determination portion (35) determining noise based on individual discrimination results of the plurality of discrimination portions. The noise discrimination portion includes at least two of a frequency component discrimination portion (32) discriminating the presence or absence of noise based on a frequency component of the input signal, a temporal change discrimination portion (33) discriminating the presence or absence of noise based on a temporal change of the input signal and a high-frequency component discrimination portion (34) discriminating the presence or absence of noise based on a high-frequency component of the input signal The noise determination portion determines noise based on (Continued)

individual discrimination results of the plurality of discrimination portions.

7 Claims, 17 Drawing Sheets

(51) Int. Cl.
    *G10L 15/00*     (2013.01)
    *G10L 21/0208*     (2013.01)
    *G10L 25/84*     (2013.01)
    *H04B 1/10*     (2006.01)
    *G10L 25/18*     (2013.01)
    *G10L 21/0216*     (2013.01)

(52) U.S. Cl.
    CPC ................ *G10L 25/84* (2013.01); *H04R 3/00* (2013.01); *G10L 21/0216* (2013.01); *G10L 25/18* (2013.01); *H04B 1/10* (2013.01)

NOISE DETECTOR AND SOUND SIGNAL OUTPUT DEVICE

TECHNICAL FIELD

The present invention relates to a noise detector and a sound signal output device.

BACKGROUND ART

A conference system is used, for example, in a conference attended by many persons such as an assembly. The conference system is constituted with, for example, a single control unit, a plurality of discussion units connected to the control unit and microphones attached to the discussion units. The control unit manages operations of the discussion units and controls an entire operation of the conference system.

The discussion unit records voice of a user of the discussion unit via the microphone and sends a voice signal thereof to the control unit. The discussion unit is allocated to each participant of a conference.

In the conference system, a participant will make a request for speech to a conference leading person such as a chairperson via the discussion unit. The request for speech is made by one of a manual method in which a user depresses a speech-request button of the discussion unit and an automatic method in which the discussion unit automatically detects speech (voice) of a user to make an automatic voice recognition.

The automatic voice recognition may erroneously detect noise such as sound coming from a desk tapped by a pen or a sound coming from documents handled as voice. In this case, there is made a request for speech which is not intended by a user, thereby resulting in a possible failure that noise spreads across a conference site.

A noise detector in which noise other than voice is not erroneously detected as voice in the automatic voice recognition has been proposed (for example, refer to Japanese Unexamined Patent Publication No. H-6-83391).

The noise (sound) detector disclosed in Japanese Unexamined Patent Publication No. H-6-83391 compares an autocorrelation coefficient of each degree with a threshold, thus making it possible to individually detect silence, noise in a low frequency range (low frequency) and noise in a high frequency range (high frequency).

SUMMARY OF INVENTION

Technical Problem

The noise detector disclosed in Japanese Unexamined Patent Publication No. H-6-83391 is able to detect, for example, impulse noise having a frequency spectrum of approximately the same level ranging from a low frequency range to a high frequency range such as sound coming from a desk tapped by a pen. However, the noise detector disclosed in Japanese Unexamined Patent Publication No. H-6-83391 is not able to detect composite noise, for example, a combination of impulse noise and noise in a high frequency range coming from sound caused by crumpling paper.

An object of the present invention is to solve the problem described above and to provide a noise detector and a sound signal output device which capable of detecting with high accuracy various types of noise including composite noise.

Solution to Problem

The noise detector for detecting noise contained in an input signal according to the present invention includes a noise discrimination portion having a plurality of discrimination portions to which the input signal is input and a noise determination portion determining noise based on individual discrimination results of the plurality of discrimination portions. The noise discrimination portion includes at least two of a frequency component discrimination portion discriminating the presence or absence of the noise based on a frequency component of the input signal, a temporal change discrimination portion discriminating the presence or absence of noise based on a temporal change of the input signal and a high-frequency component discrimination portion discriminating the presence or absence of noise based on a high-frequency component of the input signal. The noise determination portion determines noise based on individual discrimination results of the plurality of discrimination portions.

Advantageous Effects of Invention

According to the present invention, various types of noise including composite noise can be detected with high accuracy.

DESCRIPTION OF EMBODIMENTS

Embodiments of the noise detector and the sound signal output device according to the present invention will now be described with reference to the attached drawings.

Sound Signal Output Device

First, an embodiment of the sound signal output device according to the present invention will be described.

Configuration of Sound Signal Output Device

Figure 1:
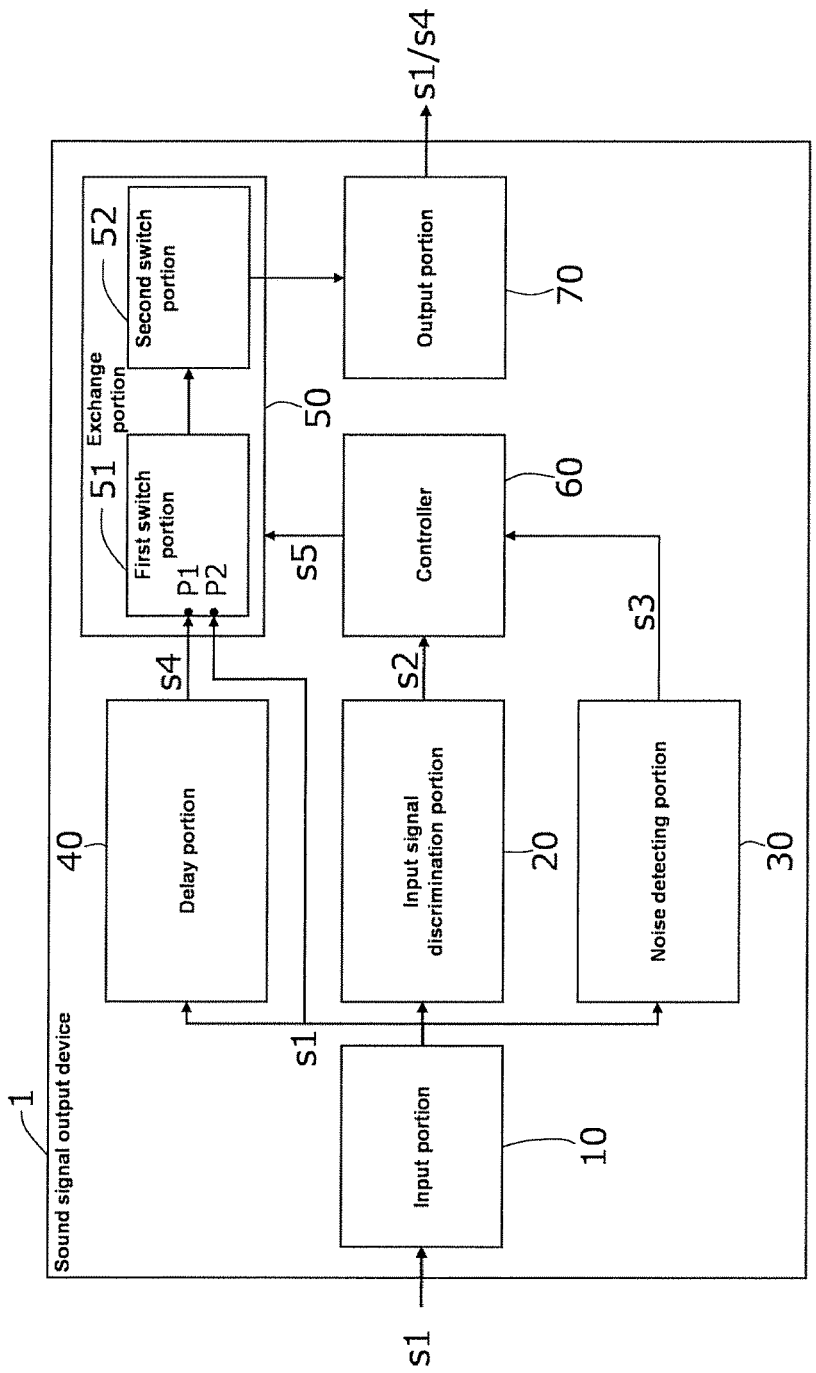
FIG. 1 is a functional block diagram which shows an embodiment of a sound signal output device according to the present invention.

FIG. 1 is a functional block diagram which shows an embodiment of the sound signal output device according to the present invention. The sound signal output device 1 includes an input portion 10, an input signal discrimination portion 20, a noise detecting portion (noise detector) 30, a delay portion 40, an exchange portion 50, a controller 60 and an output portion 70.

The input portion 10 is connected to a microphone (not shown) and receives an input signal s1 from the microphone. The input signal s1 is input from the input portion 10 to the input signal discrimination portion 20, the noise detecting portion 30, the delay portion 40 and the exchange portion 50.

The input signal discrimination portion 20 discriminates the presence or absence of the input signal s1 from the microphone. The input signal discrimination portion 20 includes, for example, a high-pass filter (not shown), a low-pass filter (not shown), a rectifier (not shown) and a comparison portion (not shown). The input signal s1 from the microphone is converted to a direct current (DC) signal by the high-pass filter, the low-pass filter and the rectifier. The comparison portion compares, for example, the DC signal with a predetermined threshold L1 described below, thereby discriminating the presence or absence of the input signal s1. A discrimination result s2 of the comparison portion is input to the controller 60.

The comparison portion in the present invention may compare, for example, a reference signal from a reference microphone installed outside the sound signal output device 1 with the DC signal. The reference signal is, for example, an environmentally-derived signal such as sound of an air conditioner.

The noise detecting portion 30 is the noise detector according to the present invention. The noise detecting portion 30 detects characteristics derived from noise contained in the input signal s1 received from a microphone, thereby detecting noise contained in the input signal s1. That is, the noise detecting portion 30 determines whether the input signal s1 is a signal derived from noise (hereinafter, referred to as a noise signal) or a signal derived from voice (hereinafter, referred to as a voice signal). A determination result (detection result) s3 of the noise detecting portion 30 is input to the controller 60. The details of the noise detecting portion 30 will be described below. Noise includes, for example, sound coming from a desk tapped by a pen, sound caused by turning over a piece of paper, sound caused by a sneeze, hand-clapping sound and sound caused by crumpling paper.

The delay portion 40 stores the input signal s1 from the input portion 10 for a predetermined period of time, generates and outputs a delayed signal s4 obtained by delaying the input signal s1 for a predetermined period of time. The delay portion 40 includes, for example, a ring buffer. The delayed signal s4 of the delay portion 40 is constantly generated while the input signal s1 is input to the delay portion 40. The delayed signal s4 is input from the delay portion 40 to the exchange portion 50.

The exchange portion 50 exchanges a signal output to the output portion 70 to one of the input signal s1 and the delayed signal s4, depending on a control signal s5 (to be described below) from the controller 60, and also exchanges between the presence and absence of the signal output to the output portion 70. The exchange portion 50 includes a first switch portion 51 and a second switch portion 52.

The first switch portion 51 exchanges a signal output from the exchange portion 50 to the output portion 70, depending on the control signal s5 (to be described later) from the controller 60. The first switch portion 51 includes a contact P1 and a contact P2. The contact P1 is connected to the delay portion 40. The delayed signal s4 from the delay portion 40 is input to the contact P1. The contact P2 is connected to the input portion 10. The input signal s1 from the input portion 10 is input to the contact P2. That is, the exchange portion 50 exchanges between the contacts of the first switch portion 51, thereby outputting one of the input signal s1 and the delayed signal s4 to the output portion 70. When the sound signal output device 1 is in an initial state, the contact of the first switch portion 51 is the contact P1.

The second switch portion 52 exchanges between the presence and absence of a signal output to the output portion 70 depending on the control signal s5 (to be described below) from the controller 60. The second switch portion 52 is, for example, a gate circuit. That is, the second switch portion 52 is, for example, in such a state that a signal is sent (hereinafter, referred to as "gate-on") when high voltage is applied to a gate and is in such a state that a signal is cut off (hereinafter referred to as "gate-off") when a low voltage is applied to the gate. When the second switch portion 52 is gate-off, the exchange portion 50 does not send a signal to the output portion 70 (mute-on). When the second switch portion 52 is gate-on, the exchange portion 50 outputs a signal to the output portion 70 (mute-off). When the sound signal output device 1 is in an initial state, the second switch portion 52 is gate-off.

The controller 60 generates a control signal s5 which controls operations of the exchange portion 50 based on output from the input signal discrimination portion 20 (discrimination result s2) and output from the noise detecting portion 30 (detection result s3). That is, the controller 60 controls output of one of the input signal s1 and the delayed signal s4 from the output portion 70 based on the discrimination result s2 and the detection result s3.

The control signal s5 is, for example, a signal which exchanges between the contact P1 and the contact P2 of the first switch portion 51 or a signal which exchanges between gate-on and gate-off of the second switch portion 52. The control signal s5 is input from the controller 60 to the exchange portion 50.

The output portion 70 outputs one of the input signal s1 from the exchange portion 50 and the delayed signal s4 from the exchange portion 50 as an output signal, for example, to a speaker, a communication line, etc., which are connected to the sound signal output device 1.

Operations of Sound Signal Output Device

Operations of the sound signal output device 1 will be then described.

Figure 2:
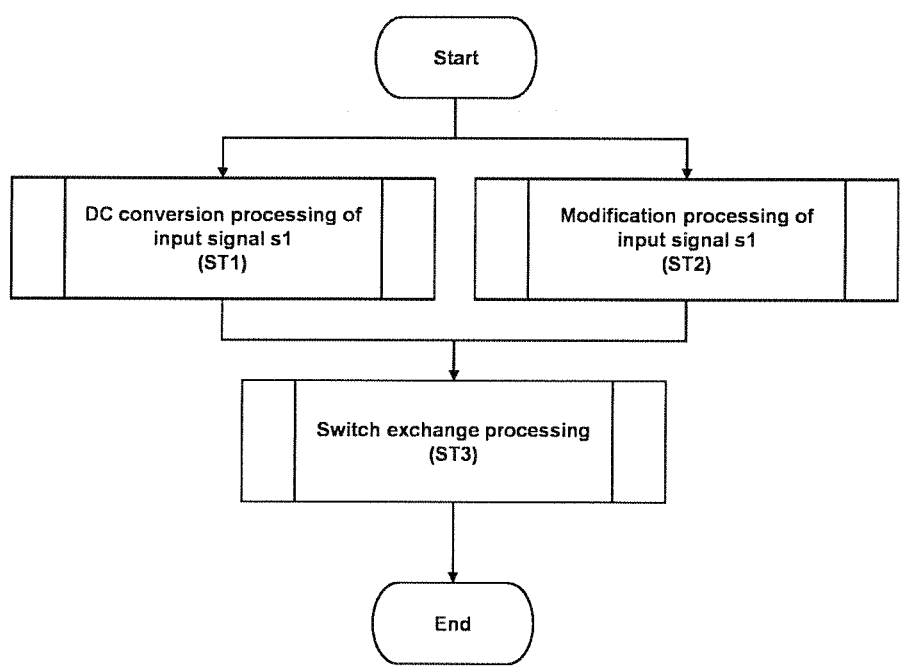
FIG. 2 is a flowchart which shows signal processing of the sound signal output device of FIG. 1.

FIG. 2 is a flowchart which shows operations of the sound signal output device 1.

The input signal s1 which has been input to the input portion 10 is input from the input portion 10 to the input signal discrimination portion 20, the noise detecting portion 30, the delay portion 40 and the exchange portion 50. The sound signal output device 1 carries out the DC conversion processing (ST1) of the input signal s1, modification processing (ST2) of the input signal s1 and switch exchange processing (ST3). The switch exchange processing (ST3) will be carried out after the DC conversion processing (ST2) of the input signal s1 and the modification processing (ST2) of the input signal s1.

In the present invention, the DC conversion processing (ST1) of the input signal s1 and the modification processing (ST2) of the input signal s1 are not necessarily carried out simultaneously but any one of them may be carried out first.

Figure 3:
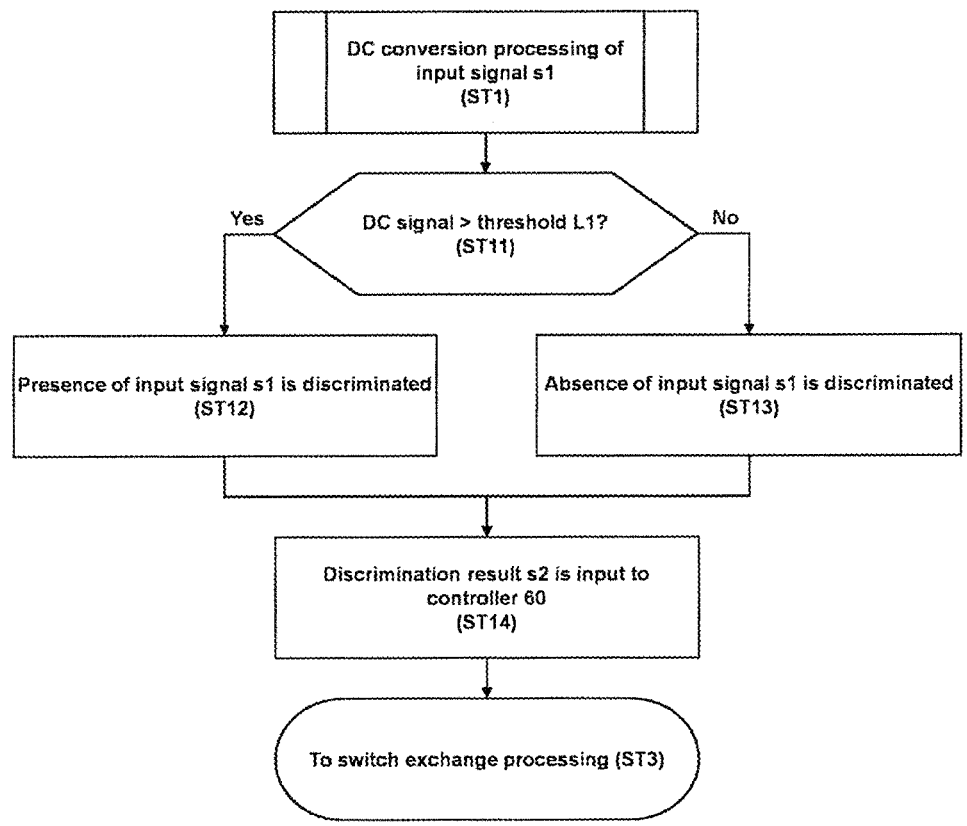
FIG. 3 is a flowchart of DC conversion processing of FIG. 2.

FIG. 3 is a flowchart of the DC conversion processing (ST1) of the input signal s1.

The input signal discrimination portion 20 carries out the DC conversion processing of the input signal s1 (ST1). An input signal converted to DC (hereinafter referred to as "DC signal") is input to a comparison portion of the input signal discrimination portion 20. The comparison portion compares the DC signal with a predetermined threshold L1 stored at a storage portion (not shown) included in the sound signal output device 1 (ST11). The threshold L1 is a threshold which is used by the sound signal output device 1 for determining the presence or absence of the input signal s1. When the DC signal is greater than the threshold L1 ("Yes" in ST11), the input signal discrimination portion 20 discriminates the presence of the input signal s1 (sound found) (ST12). On the other hand, when the DC signal is smaller than the threshold L1 ("No" in ST11), the input signal discrimination portion 20 discriminates the absence of the input signal s1 (silence) (ST13). The discrimination result s2 is input from the input signal discrimination portion 20 to the controller 60 (ST14).

Figure 4:
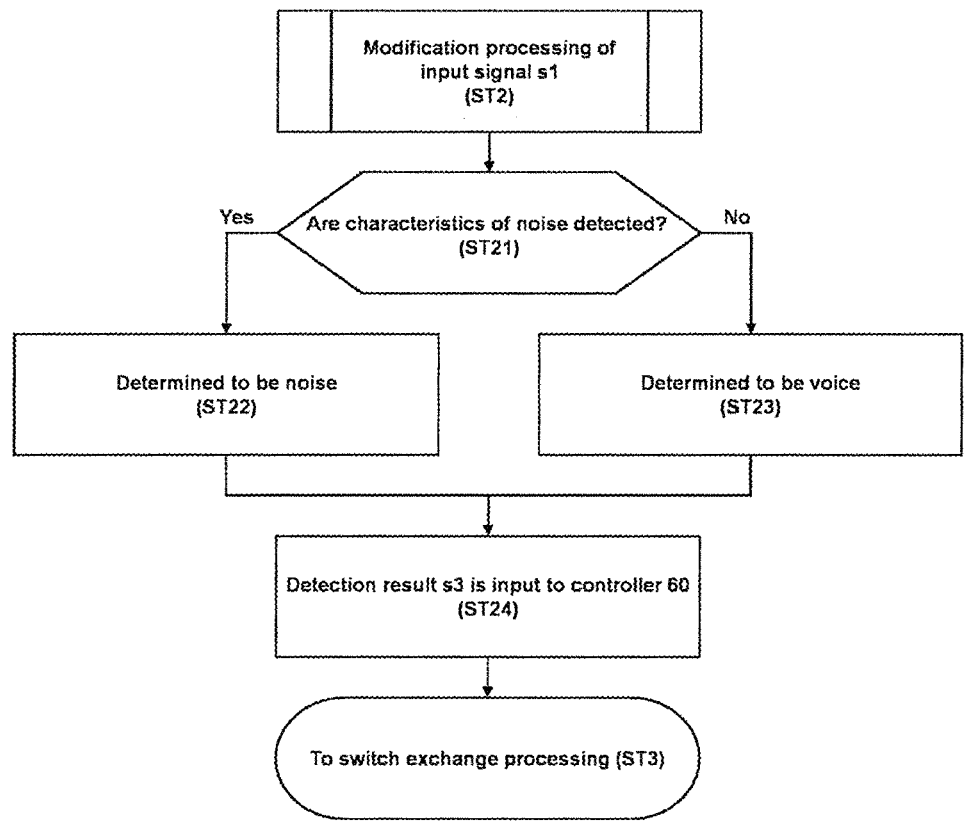
FIG. 4 is a flowchart of modification processing of FIG. 2.

FIG. 4 is a flowchart of modification processing of the input signal s1 (ST2).

The noise detecting portion 30 carries out the modification processing of the input signal s1 (ST2). The modification processing includes processing ST111, ST112, ST113, ST114, ST121 and ST131 to be described below. The noise detecting portion 30 detects characteristics of noise by using a signal after being modified (ST21). When characteristics derived from noise are detected in the input signal s1 (ST21) ("Yes" in ST21), the noise detecting portion 30 determines that the input signal s1 is a noise signal (ST22). On the other hand, when no characteristics derived from noise are detected in the input signal s1 ("No" in ST21), the noise detecting portion 30 determines that the input signal s1 is a voice signal (ST23). The detection result s3 is input from the noise detecting portion 30 to the controller 60 (ST24). The details of processing contents of the noise detecting portion 30 will be described below.

Referring now back to FIG. 2, next, the controller 60 carries out the switch exchange processing (ST3). The switch exchange processing (ST3) is such processing that the control signal s5 is generated from the discrimination result s2 of the input signal discrimination portion 20 and the detection result s3 of the noise detecting portion 30, and then exchanging between the first switch portion 51 and the second switch portion 52 of the exchange portion 50.

Figure 5:
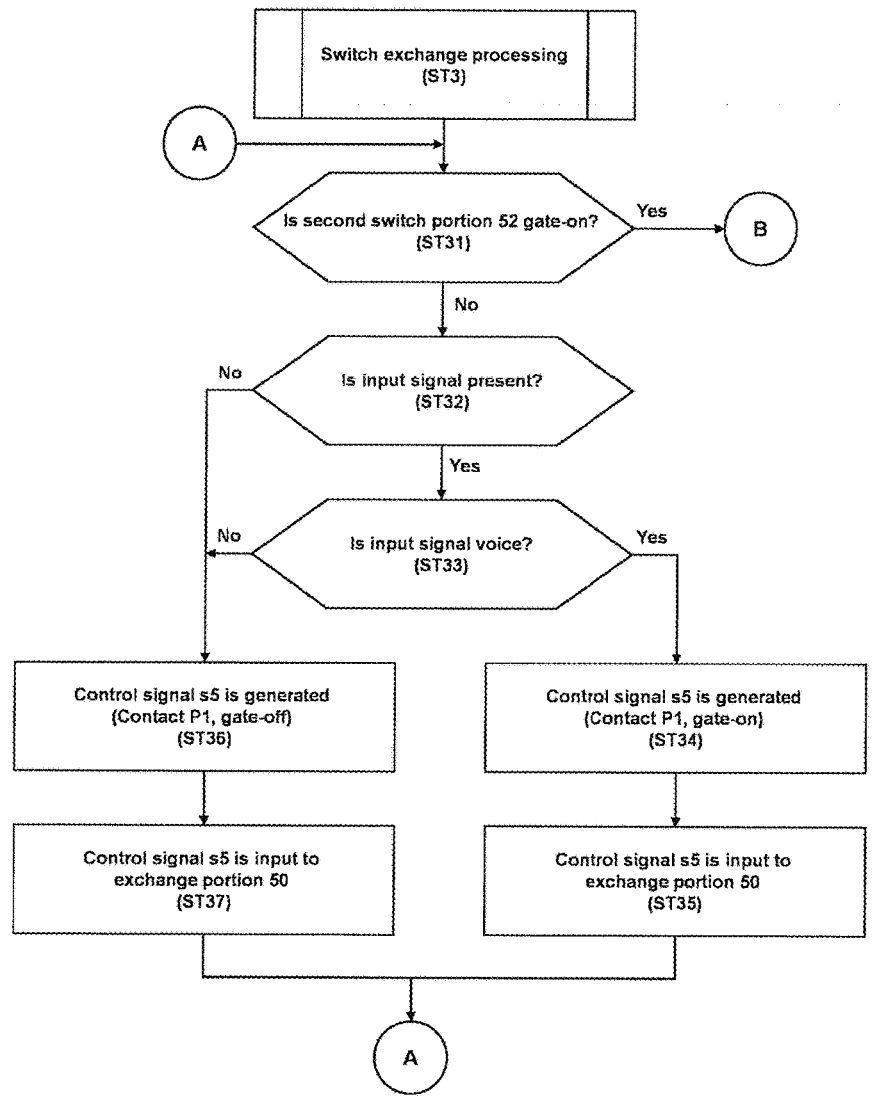
FIG. 5 is a flowchart which shows some of processing in switch exchange processing of FIG. 2.

FIG. 5 is a flowchart which shows some of processing in the switch exchange processing (ST3).

First, the controller 60 confirms whether the second switch portion 52 is gate-on or gate-off (ST31). When the second switch portion 52 is gate-off ("No" in ST31), the controller 60 confirms whether the input signal s1 is present or absent based on the discrimination result s2 of the input signal discrimination portion 20 (ST32).

When the input signal s1 is present (sound found) ("Yes" in ST32), the controller 60 confirms whether the input signal s1 is a voice signal or a noise signal based on the detection result s3 of the noise detecting portion 30 (ST33). When the input signal s1 is a voice signal ("Yes" in ST33), the controller 60 generates a control signal s5 which exchanges the contact of the first switch portion 51 to the contact P1 and exchanges the second switch portion 52 to gate-on (ST34). The control signal s5 is input from the controller 60 to the exchange portion 50 (ST35). As a result, the contact of the first switch portion 51 is the contact P1, and the second switch portion 52 is gate-on (mute-off). That is, the delayed signal s4 is input from the exchange portion 50 to the output portion 70. Namely, the sound signal output device 1 outputs the delayed signal s4 as an output signal.

On the other hand, when the input signal s1 is absent (silence) ("No" in ST32) or when the input signal s1 is a noise signal ("No" in ST33), the controller 60 generates a control signal s5 which exchanges the contact of the first switch portion 51 to the contact P1 and retains the second switch portion 52 to be gate-off (ST36). The control signal s5 is input from the controller 60 to the exchange portion 50 (ST37). As a result, the contact of the first switch portion 51 is to the contact P1 and the second switch portion 52 is gate-off (mute-on). That is, no signal (delayed signal s4) is input from the exchange portion 50 to the output portion 70. Namely, the sound signal output device 1 will not output a signal.

Figure 6:
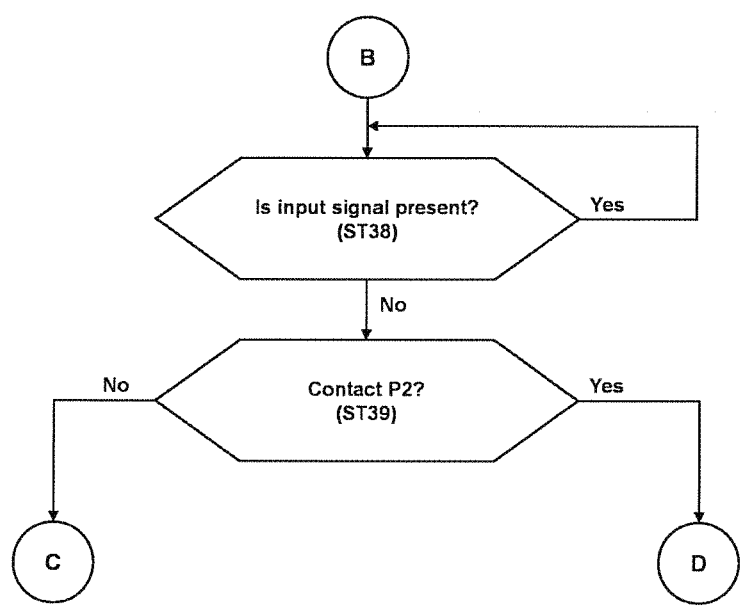
FIG. 6 is a flowchart which shows some of another processing in the switch exchange processing of FIG. 2.

FIG. 6 is a flowchart which shows some of another processing in the switch exchange processing (ST3). FIG. 6 shows the processing when the second switch portion 52 is gate-on ("Yes" in ST31) in the switch exchange processing (ST3).

When the second switch portion 52 is gate-on ("Yes" in ST31), the controller 60 confirms whether the input signal s1 is present or absent based on the discrimination result s2 of the input signal discrimination portion 20 (ST 38).

When the input signal s1 is present (sound found) ("Yes" in ST38), the controller 60 repeats confirmation of the presence or absence of the input signal s1 (ST38).

When the input signal s1 is absent (silence) ("No" in ST38), the controller 60 confirms whether the contact of the first switch portion 51 is the contact P1 or the contact P2 (ST39).

Figure 7:
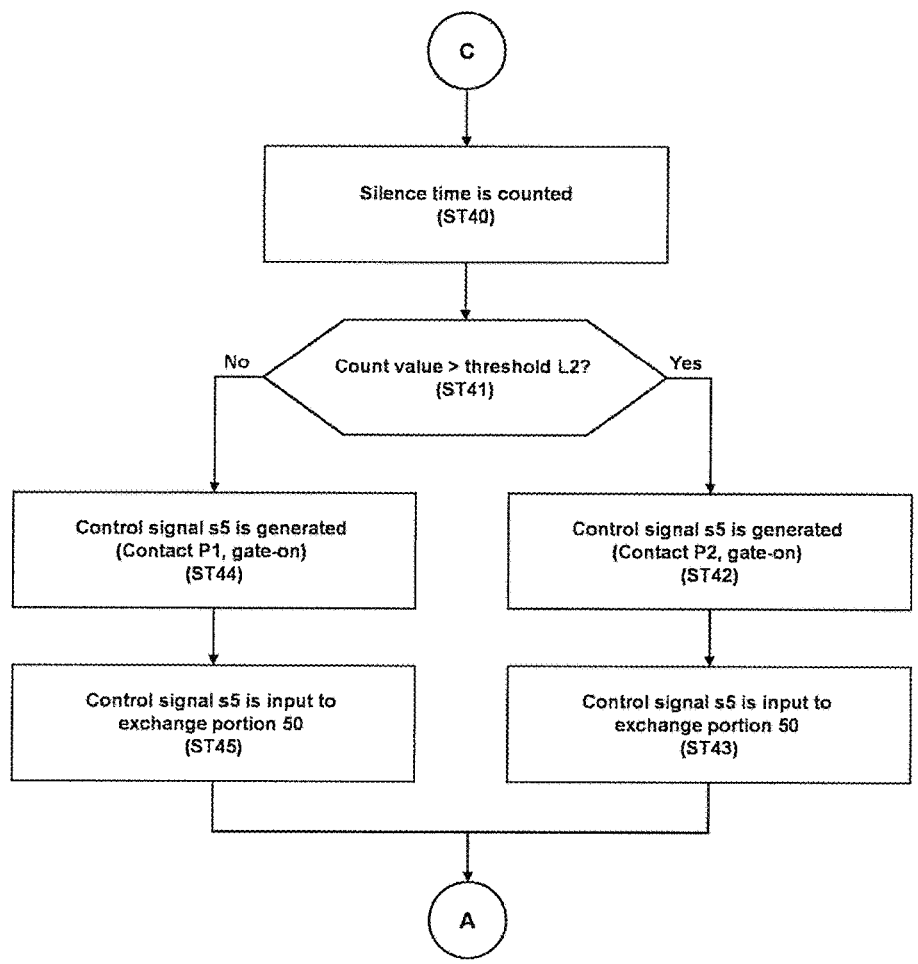
FIG. 7 is a flowchart which shows some of still another processing in the switch exchange processing of FIG. 2.

FIG. 7 is a flowchart which shows some of still another processing in the switch exchange processing (ST3). FIG. 7 shows the processing when the contact of the first switch 51 is the contact P1 ("No" in ST39) in the switch exchange processing (ST3).

When the contact of the first switch portion 51 is the contact P1 ("No" in ST39), the controller 60 counts silence time by a counter (not shown) (ST40).

Next, the controller 60 compares a count value of the counter with a predetermined threshold L2 stored at the storage portion (ST41). The threshold L2 is, for example, a threshold which is used by the sound signal output device 1 for detecting timing such as breathing of a participant.

When the count value is greater than the threshold L2 ("Yes" in ST41), the controller 60 generates a control signal s5 which exchanges the contact of the first switch portion 51 to the contact P2 and retains the second switch portion 52 to be gate-on (ST42). The control signal s5 is input from the controller 60 to the exchange portion 50 (ST43). As a result, the contact of the first switch portion 51 is the contact P2, and the second switch portion 52 retains gate-on (mute-off). That is, the input signal s1 is input from the exchange portion 50 to the output portion 70. Namely, the sound signal output device 1 outputs in real time the input signal s1 as an output signal.

On the other hand, when the count value is smaller than the threshold L2 ("No" in ST41), the controller 60 generates a control signal s5 which retains the contact of the first switch portion 51 to be the contact P1 and retains the second switch portion 52 to be gate-on (ST44). The control signal s5 is input from the controller 60 to the exchange portion 50 (ST45). Namely, the sound signal output device 1 outputs the delayed signal s4 as an output signal.

Figure 8:
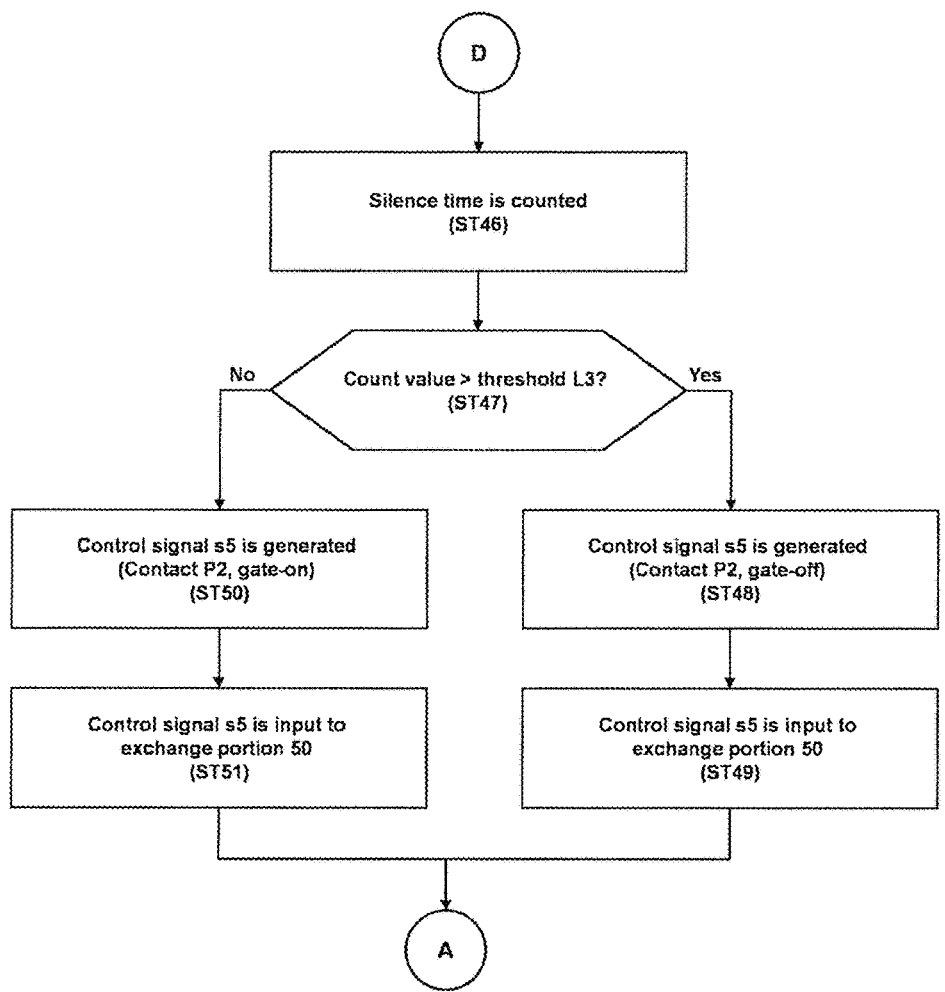
FIG. 8 is a flowchart which shows some of further still another processing in the switch exchange processing of FIG. 2.

FIG. 8 is a flowchart which shows some of further still another processing in the switch exchange processing (ST3). FIG. 8 shows the processing when the contact of the first switch 51 is the contact P2 ("Yes" in ST39) in the switch exchange processing (ST3).

When the contact of the first switch portion 51 is the contact P2 ("Yes" in ST39), the controller 60 counts silence time by a counter (ST46).

Next, the controller 60 compares a count value of the counter with a predetermined threshold L3 stored at the storage portion (ST47). The threshold L3 is a threshold which is used by the sound signal output device 1 for determining whether a participant has completed speech or not, and a value which is greater than the threshold L2.

When the count value is greater than the threshold L3 ("Yes" in ST47), the controller 60 generates a control signal s5 which retains the contact of the first switch portion 51 to be the contact P2 and exchanges the second switch portion 52 to gate-off (ST48). The control signal s5 is input from the controller 60 to the exchange portion 50 (ST49). As a result, the contact of the first switch portion 51 is retained as the contact P2, and the second switch portion 52 is gate-off (mute-on). That is, no signal (delayed signal s4) is input from the exchange portion 50 to the output portion 70. Namely, the sound signal output device 1 will not output a signal.

When the count value is smaller than the threshold L3 ("No" in ST47), the controller 60 generates a control signal s5 which retains the contact of the first switch portion 51 to be the contact P2 and retains the second switch portion 52 to be gate-on (ST50). The control signal s5 is input from the controller 60 to the exchange portion 50 (ST51).

As described above, when the second switch portion 52 is gate-off, the sound signal output device 1 outputs the delayed signal s4 upon input of a voice signal (mute-off), and does not output a signal upon input of a noise signal (mute-on). That is, the sound signal output device 1 has automatic voice recognition functions which recognize a voice signal to output an output signal.

When silence time is greater than the threshold L3, the sound signal output device 1 judges that speech has been completed and does not output a signal (mute-on). When the silence time is greater than the threshold L2 and is smaller than the threshold L3, the sound signal output device 1 judges that the silence time is short-time silence such as breathing and outputs in real time the input signal s1 (mute-off). In other words, the exchange portion 50 outputs the input signal s1 from the input portion 10 to the output portion 70 when the input signal discrimination portion 20 discriminates that the input signal s1 from the input portion 10 is not found in predetermined time (time which is greater than the threshold L2 and is smaller than the threshold L3). That is, the sound signal output device 1 outputs the delayed signal s4 at the beginning of speech and outputs the input signal s1 in real time (outputs the input signal s1 without delay) at the timing of breathing, etc. Namely, the sound signal output device 1 includes the delay portion 40, the exchange portion 50 and the controller 60, thereby preventing what-is-called "loss of voice signals at the beginning" caused in noise detection processing, etc.

Synopsis

According to the embodiment described above, the sound signal output device 1 is able to control output of an output signal (input signal s1 or delayed signal s4) depending on the detection result s3 of the noise detecting portion 30.

In addition, the sound signal output device 1 includes the delay portion 40 and the exchange portion 50, and exchanges the exchange portion 50 based on the discrimination result s2 from the input signal discrimination portion 20 and the detection result s3 from the noise detecting portion 30. Thus, the sound signal output device 1 in an initial state outputs the delayed signal s4 upon input of a voice signal (mute-off) and does not output a signal upon input of a noise signal (mute-on).

Further, the sound signal output device 1 outputs the delayed signal s4 at the beginning of speech and outputs in real time the input signal s1 when the input signal discrimination portion 20 detects silence such as breathing. That is, the sound signal output device 1 prevents what-is-called "loss of voice signals at the beginning" caused in processing of the noise detecting portion 30, etc.

The exchange portion 50 in the present invention includes the second switch 52. Alternatively, the output portion in the present invention may include the second switch portion. In this case, the control signal s5 which exchanges between gate-on and gate-off is input from the controller to the output portion.

In addition, in the sound signal output device according to the present invention, a configuration of the controller is not limited to that of the present embodiment. That is, for example, the controller may be constituted with a control circuit which controls the first switch portion and a control circuit which controls the second switch portion.

Further, the sound signal output device according to the present invention may exchange the second switch portion from gate-on to gate-off when the noise detecting portion detects noise. That is, for example, the sound signal output device may be configured not to output a signal when the noise detecting portion detects noise.

Noise Detector

Next, an embodiment of the noise detector according to the present invention will be described.

In the following description, a power spectrum is a waveform chart in which power of a signal at each frequency band is made into a graph in which the horizontal axis corresponds to a frequency. A time-base waveform is a waveform chart in which power (amplitude) of a signal at each time is made into a graph in which the horizontal axis corresponds to time.

The noise detector according to the present invention is the noise detecting portion 30 which constitutes the previously described sound signal output device 1. Therefore, in the following description, the noise detector according to the present invention is given the reference numeral "30" which is the same as that of the noise detecting portion 30.

Configuration of Noise Detector

Figure 9:
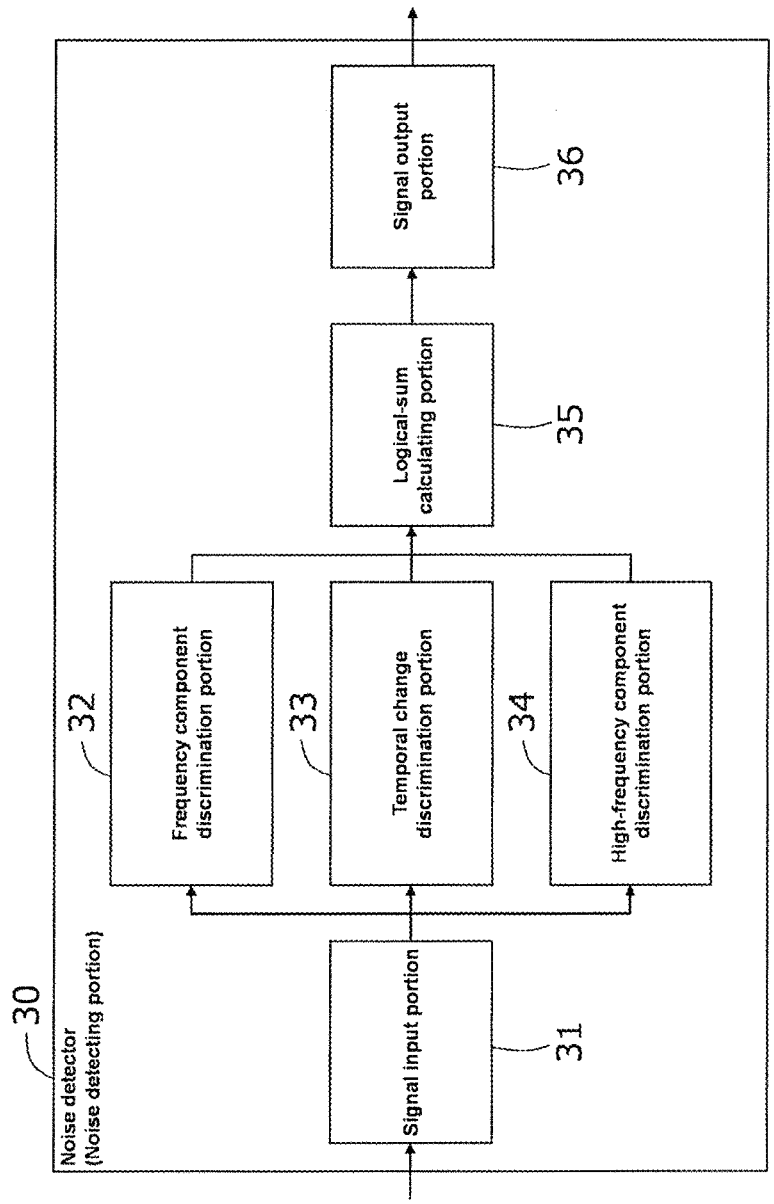
FIG. 9 is a functional block diagram which shows an embodiment of a noise detector according to the present invention.

FIG. 9 is a functional block diagram which shows an embodiment of the noise detector (noise detecting portion) according to the present invention.

The noise detector 30 includes a signal input portion 31, a frequency component discrimination portion 32, a temporal change discrimination portion 33, a high-frequency component discrimination portion 34, a logical-sum calculating portion 35, and a signal output portion 36. The frequency component discrimination portion 32, the temporal change discrimination portion 33 and the high-frequency component discrimination portion 34 constitute the noise discrimination portion of the present invention. That is, the noise discrimination portion includes a plurality of discrimination portions to which the input signal s1 is input (they are the following three portions; the frequency component discrimination portion 32, the temporal change discrimination portion 33 and the high-frequency component discrimination portion 34).

The signal input portion 31 receives, as the input signal s1, an output signal which has been output from a microphone, for example, via the input portion 10 of the sound signal output device 1. The input signal s1 is input from the signal input portion 31 to each of the frequency component discrimination portion 32, the temporal change discrimination portion 33 and the high-frequency component discrimination portion 34.

Figure 10:
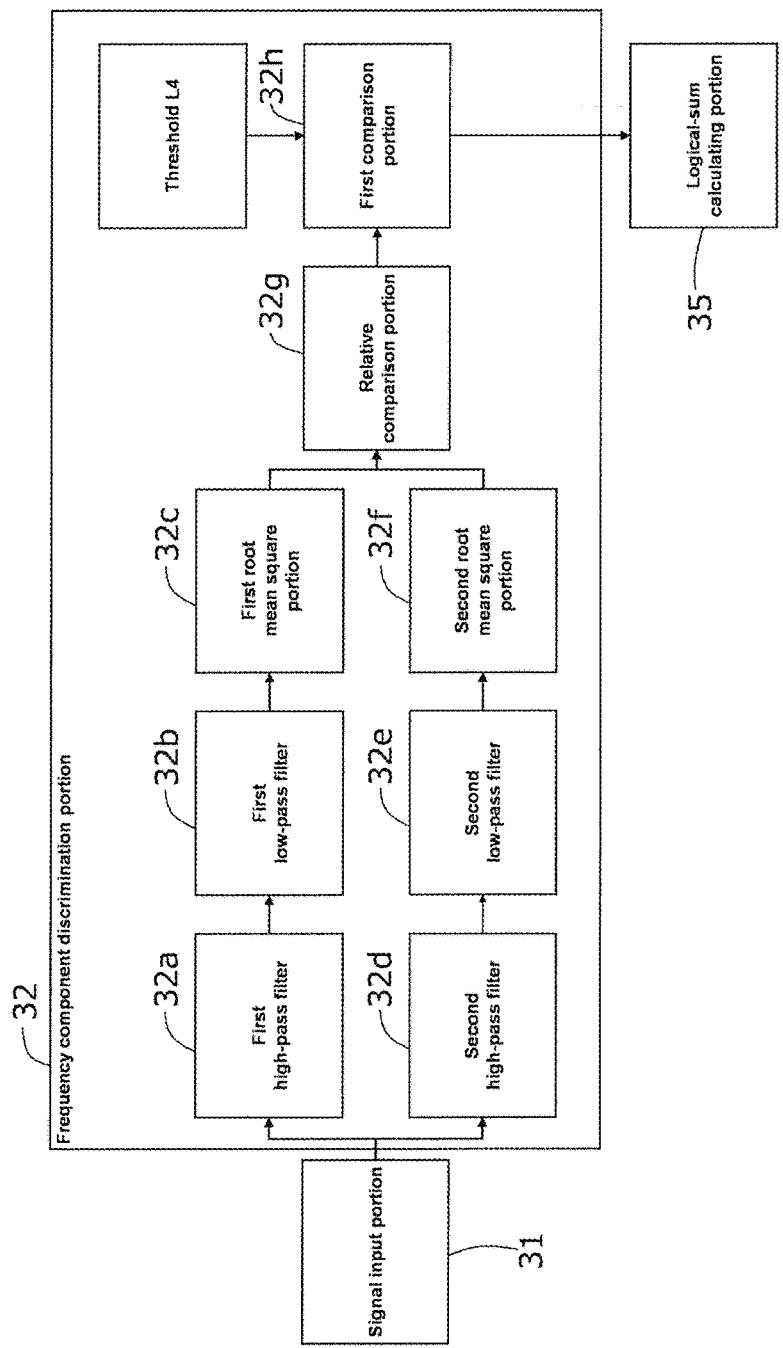
FIG. 10 is a functional block diagram of a frequency component discrimination portion of the noise detector of FIG. 9.

FIG. 10 is a functional block diagram of the frequency component discrimination portion 32.

Usually, a power spectrum of voice signal is greater in power at a low and medium frequency range than at a high frequency range. The frequency component discrimination portion 32 discriminates the presence or absence of noise based on a frequency component of the input signal s1. That is, the frequency component discrimination portion 32 divides a power spectrum of the input signal s1 into a power spectrum of frequency band at which characteristics of voice appear and a power spectrum of frequency band at which characteristics of noise appear. The frequency component discrimination portion 32 compares these two power spectra with each other, thereby discriminating whether the input signal s1 is a voice signal or a noise signal.

Here, the frequency band at which characteristics of voice appear is, for example, a frequency band which contains frequencies of voice in a range of 100 Hz to 1 kHz. The frequency band at which characteristics of noise appear is, for example, a frequency band of 1 kHz to 2 kHz which is higher than that of voice.

The frequency component discrimination portion 32 includes a first high-pass filter 32*a*, a first low-pass filter 32*b*, a first root mean square portion 32*c*, a second high-pass filter 32*d*, a second low-pass filter 32*e*, a second root mean square portion 32*f*, a relative comparison portion 32*g*, and a first comparison portion 32*h*.

The first high-pass filter 32*a* removes from the input signal s1 a signal having a frequency band lower than that at which characteristics of voice appear. The first low-pass filter 32*b* removes from signals which have passed through the first high-pass filter 32*a* a signal having a frequency band higher than that at which characteristics of voice appear. That is, the first high-pass filter 32*a* and the first low-pass filter 32*b* constitute a first filter portion which takes out from the input signal s1 a signal having a frequency band at which characteristics of voice appear (the signal is allowed to pass).

The first root mean square portion 32*c* performs root mean square processing for a predetermined number of samples n (for example, n=10) of signals having a frequency band at which characteristics of voice appear which have passed through the first filter portion. The first root mean square portion 32*c* uses the root mean square processing to generate a power spectrum (hereinafter, referred to as "voice signal power spectrum") of a signal having a frequency band at which characteristics of voice appear.

The second high-pass filter 32*d* removes from the input signal s1 a signal having a frequency band lower than that at which characteristics of noise appear. The second low-pass filter 32*e* removes from signals which have passed through the second high-pass filter 32*d* a signal having a frequency band higher than that at which characteristics of noise appear. That is, the second high-pass filter 32*d* and the second low-pass filter 32*e* constitute a second filter portion which takes out from the input signal s1 a signal having a frequency band at which characteristics of noise appear (the signal is allowed to pass).

The second root mean square portion 32*f* performs root mean square processing for a predetermined number of samples n (for example, n=10) of signals having a frequency band at which characteristics of noise appear which have passed through the second filter portion. The second root mean square portion 32*f* uses the root mean square processing to generate a power spectrum (hereinafter, referred to as "noise signal power spectrum") of a signal having a frequency band at which characteristics of noise appear.

The relative comparison portion 32*g* compares the voice signal power spectrum generated by the first root mean square portion 32*c* with the noise signal power spectrum generated by the second root mean square portion 32*f* to calculate a difference between them. The relative comparison portion 32*g* outputs the calculated difference to the first comparison portion 32*h*.

The first comparison portion 32*h* compares the difference output by the relative comparison portion 32*g* with a predetermined threshold L4 stored at the storage portion (not shown) included in the noise detector 30, thereby outputting a result thereof to the logical-sum calculating portion 35. The threshold L4 is a threshold which is used by the frequency component discrimination portion 32 for discriminating whether the input signal s1 is a voice signal or a noise signal.

The frequency component discrimination portion in the present invention may be configured to divide the power spectrum of the input signal s1 into a frequency band at which characteristics of voice appear and a frequency band at which characteristics of noise appear. That is, the first filter portion and the second filter portion may be a band pass filter, for example.

Figure 11:
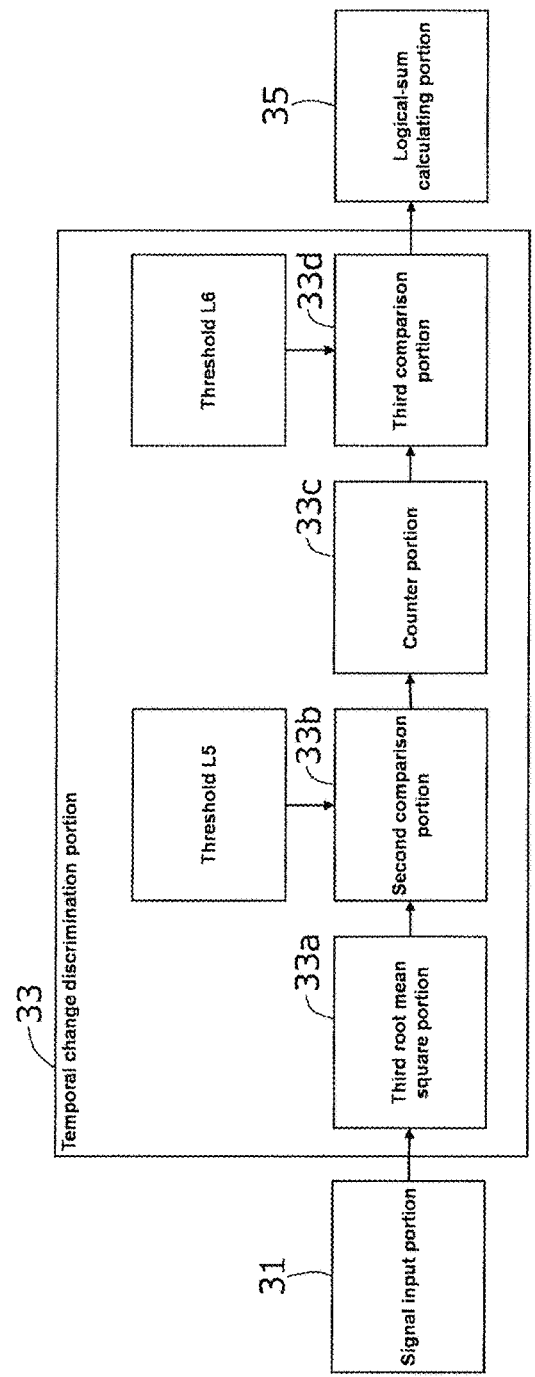
FIG. 11 is a functional block diagram of a temporal change discrimination portion of the noise detector of FIG. 9.

FIG. 11 is a functional block diagram of the temporal change discrimination portion 33.

Usually, a time-base waveform of impulse noise is varied abruptly immediately after occurrence of noise and, thereafter, attenuated at a predetermined time. The temporal change discrimination portion 33 discriminates the presence or absence of noise based on a temporal change of the input signal s1. That is, the temporal change discrimination portion 33 counts a temporal change of a signal having a time-base waveform of impulse noise, thereby discriminating a voice signal or a noise signal of the input signal s1.

The temporal change discrimination portion 33 includes a third root mean square portion 33*a*, a second comparison portion 33*b*, a counter portion 33*c* and a third comparison portion 33*d*.

The third root mean square portion 33*a* performs root mean square processing for a predetermined number of samples n (for example, n=10) of the input signal s1. The third root mean square portion 33*a* generates a power spectrum of the input signal s1 (hereinafter, referred to as "input signal power spectrum") by using the root mean square processing of the input signal s1.

The second comparison portion 33*b* compares the input signal power spectrum generated by the third root mean square portion 33a with a predetermined threshold L5 stored at the storage portion (not shown) included in the noise detector 30, thereby outputting a result thereof to the counter portion 33c. The threshold L5 is a threshold which is used by the temporal change discrimination portion 33 for discriminating whether the input signal s1 is a voice signal or not.

The counter portion 33c counts a temporal change (attenuation time) in a time-base waveform of a signal judged by the second comparison portion 33b to be in excess of the predetermined threshold L5, thereby outputting a result thereof to the third comparison portion 33d.

The third comparison portion 33d compares a count value of the counter portion 33c with a predetermined threshold L6 stored at the storage portion (not shown) included in the noise detector 30, thereby outputting a result thereof to the logical-sum calculating portion 35. The threshold L6 is a threshold which is used by the temporal change discrimination portion 33 for discriminating whether the input signal s1 is a voice signal or a noise signal.

Figure 12:
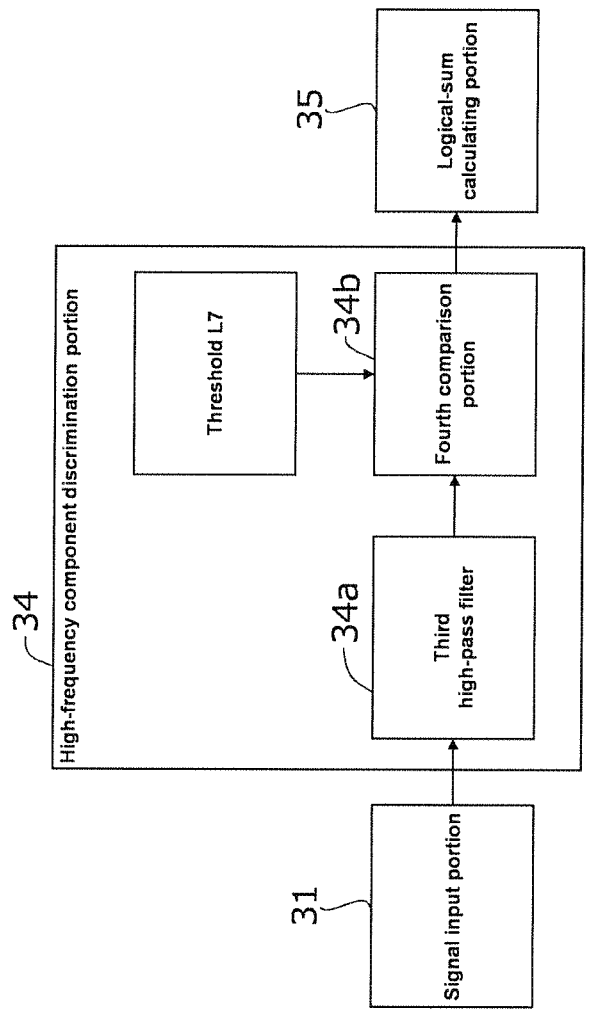
FIG. 12 is a functional block diagram of a high-frequency component discrimination portion of the noise detector of FIG. 9.

FIG. 12 is a functional block diagram of the high-frequency component discrimination portion 34.

Frequency spectra of noise include a spectrum with great power in a high frequency range. The high-frequency component discrimination portion 34 discriminates the presence or absence of noise based on a high-frequency component of the input signal s1. That is, the high-frequency component discrimination portion 34 takes out from the input signal s1 a signal having a high frequency band at which characteristics of noise appear, thereby detecting power of the signal to discriminate whether the input signal s1 is a voice signal or a noise signal.

The high frequency band taken out by the high-frequency component discrimination portion 34 is, for example, a frequency band higher than the high frequency band taken out by the frequency component discrimination portion 32.

The high-frequency component discrimination portion 34 includes a third high-pass filter 34a and a fourth comparison portion 34b.

The third high-pass filter 34a removes from the input signal a signal having a frequency band lower than that at which characteristics of noise in a high frequency range appear. That is, the third high-pass filter 34a constitutes a third filter portion which takes out from the input signal s1 a signal having a frequency band at which characteristics of noise in a high frequency range appear (the signal is allowed to pass).

The third filter portion in the present invention may be configured with a plurality of high-pass filters. That is, the third filter portion may be configured with two high-pass filters connected in series, for example, when the high-frequency component discrimination portion is configured with an FPGA (Field-Programmable Gate Array) and a high-level filter cannot be configured with a single high-pass filter due to restriction on a resource of the FPGA.

The fourth comparison portion 34b compares a power spectrum of a signal having a frequency band at which characteristics of noise in a high frequency range appear are taken out by the third filter portion with a predetermined threshold L7 stored at the storage portion (not shown) included in the noise detector 30, thereby outputting a result thereof to the logical-sum calculating portion 35. The threshold L7 is a threshold which is used by the high-frequency component discrimination portion 34 for discriminating whether the input signal s1 is a voice signal or a noise signal.

Referring now back to FIG. 9, the logical-sum calculating portion 35 calculates a logical sum of output of the frequency component discrimination portion 32 (first comparison portion 32h), output of the temporal change discrimination portion 33 (third comparison portion 33d) and output of the high-frequency component discrimination portion 34 (fourth comparison portion 34b). The logical-sum calculating portion 35 determines that the input signal s1 is a noise signal where any one of the output of the first comparison portion 32h, the output of the third comparison portion 33d and the output of the fourth comparison portion 34b is the output which has been discriminated to be noise. That is, the logical-sum calculating portion 35 functions as a noise determination portion which determines noise from the input signal s1 based on discrimination results of the plurality of discrimination portions.

The signal output portion 36 outputs a determination result of the logical-sum calculating portion 35.

A value of each of the thresholds L4 to L7 will be set whenever necessary in accordance with a frequency band of noise to be detected by the noise detector 30.

Operations of Noise Detector

Next, operations of the noise detector 30 will be described.

Figure 13:
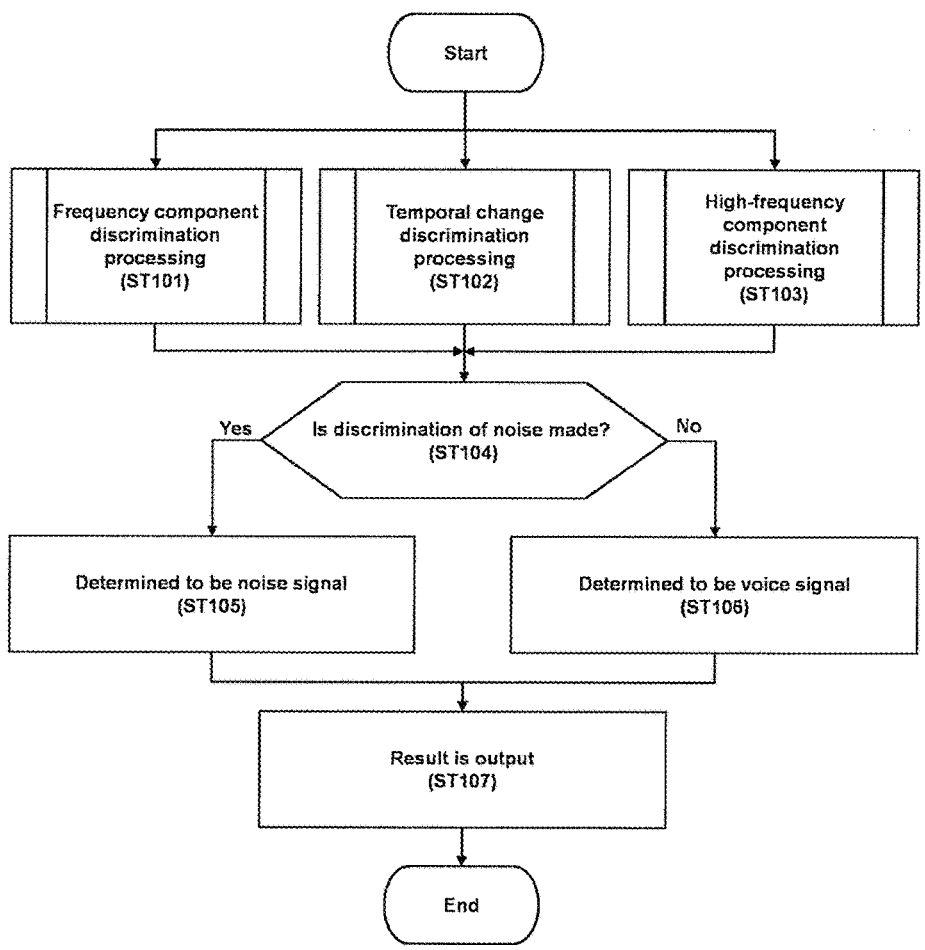
FIG. 13 is a flowchart which shows signal processing of the noise detector of FIG. 9.

FIG. 13 is a flowchart which shows the signal processing of the noise detector 30.

The noise detector 30 carries out the frequency-component discrimination processing (ST101), temporal change discrimination processing (ST102) and high-frequency component discrimination processing (ST103), while the input signal s1 is input from the signal input portion 31.

Figure 14:
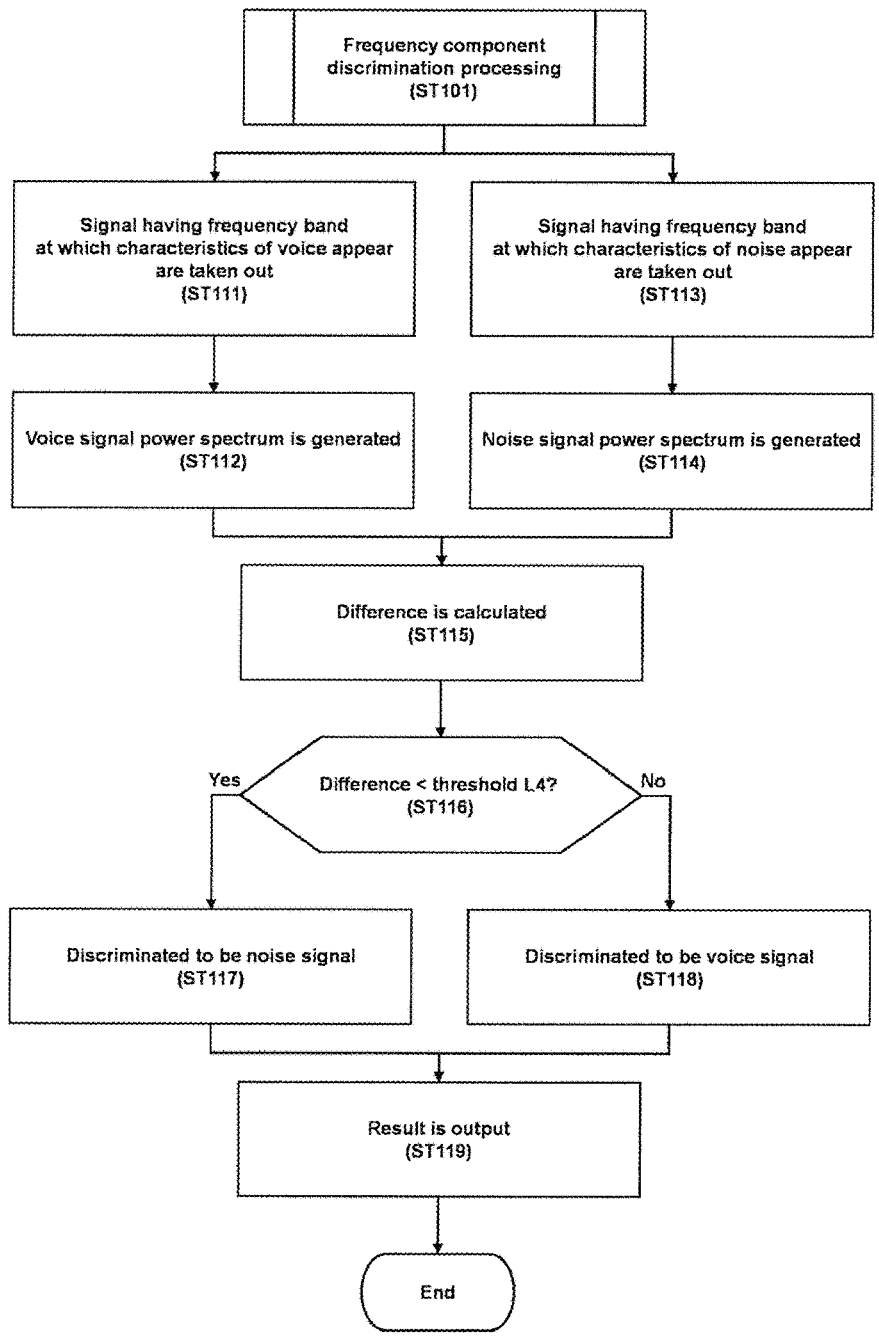
FIG. 14 is a flowchart of frequency component discrimination processing of FIG. 13.

FIG. 14 is a flowchart of the frequency component discrimination processing (ST101).

The frequency component discrimination processing (ST101) is processing for detecting noise having a power spectrum equal in power over a low frequency range to a high frequency range. The frequency component discrimination processing (ST101) is carried out by the frequency component discrimination portion 32.

First, the first filter portion takes out from the input signal s1 a signal having a frequency band at which characteristics of voice appear (ST111). The first root mean square portion 32c generates a voice signal power spectrum based on the signal having a frequency band at which characteristics of voice appear. (ST112).

Similarly, the second filter portion takes out from the input signal s1 a signal having a frequency band at which characteristics of noise appear (ST113). The second root mean square portion 32f generates a noise signal power spectrum based on the signal having a frequency band at which characteristics of noise appear (ST114).

Next, the relative comparison portion 32g compares the voice signal power spectrum with the noise signal power spectrum, and calculates a difference between them (ST115). The difference is calculated, for example, by subtracting the noise signal power spectrum from the voice signal power spectrum.

Next, the first comparison portion 32h compares the difference calculated by the relative comparison portion 32g with the predetermined threshold L4 (T116). When the difference is smaller than the threshold L4 ("Yes" in ST116), the frequency component discrimination portion 32 discriminates that the input signal s1 is a noise signal (ST117). On the other hand, when the difference is greater than the threshold L4 ("No" in ST116), the frequency component discrimination portion 32 discriminates that the input signal s1 is a voice signal (ST118). The frequency component discrimination portion 32 outputs a discrimination result to the logical-sum calculating portion 35 (ST119).

Figure 15:
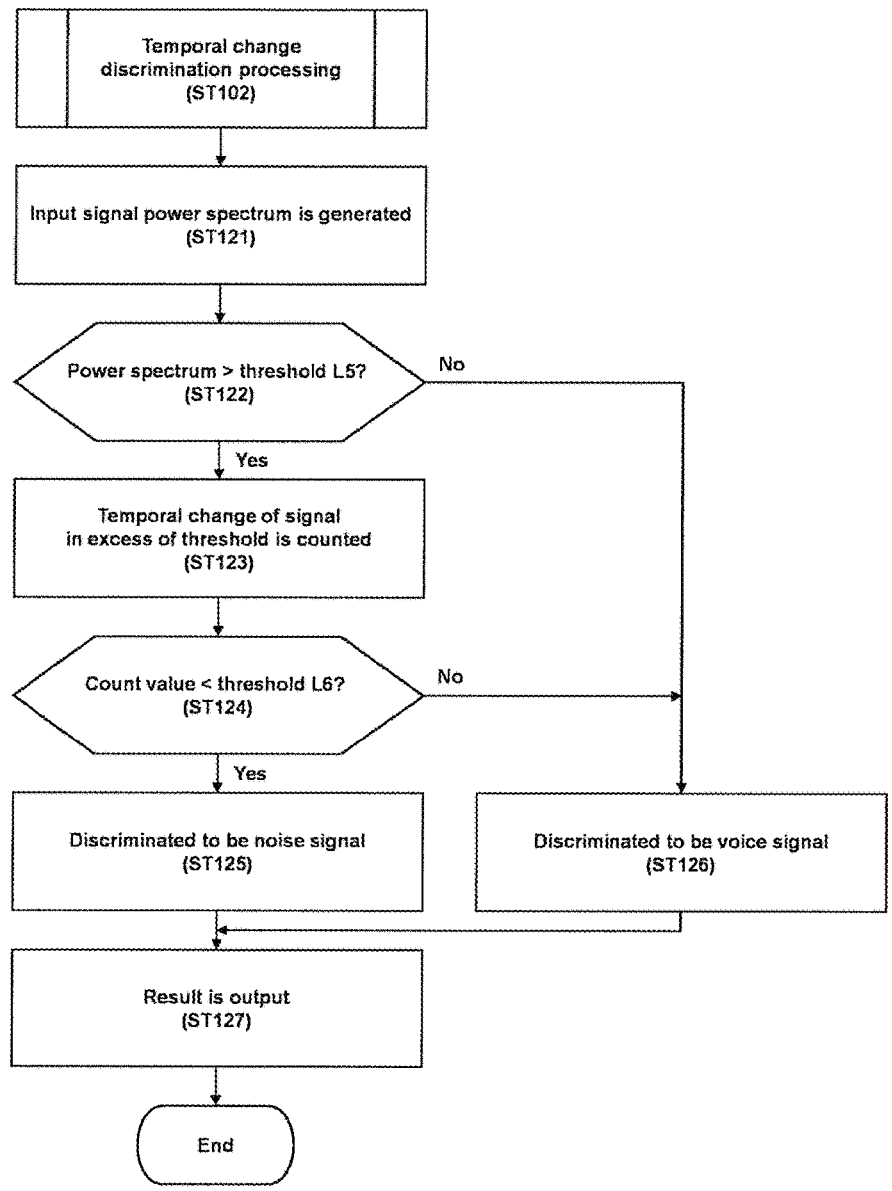
FIG. 15 is a flowchart of the temporal change discrimination processing of FIG. 13.

FIG. 15 is a flowchart of the temporal change discrimination processing (ST102).

The temporal change discrimination processing (ST102) is processing for detecting noise having an impulse power spectrum. The temporal change discrimination processing (ST102) is carried out by the temporal change discrimination portion 33.

First, the third root mean square portion 33a generates an input signal power spectrum (ST121).

Next, the second comparison portion 33b compares the input signal power spectrum with the predetermined threshold L5 (ST122). When the input signal power spectrum is greater than the threshold L5 ("Yes" in ST122), the counter portion 33c counts a temporal change in time-base waveform of a signal in excess of the threshold L5 (ST123). On the other hand, when input signal power spectrum is smaller than the threshold L5 ("No" in ST122), the temporal change discrimination portion 33 discriminates that the input signal s1 is a voice signal (ST126).

Next, the third comparison portion 33d compares a count value of the counter portion 33c with the predetermined threshold L6 (ST124). When the count value is smaller than the threshold L6 ("Yes" in ST124), the temporal change discrimination portion 33 discriminates that the input signal s1 is a noise signal (ST125). On the other hand, when the count value is greater than the threshold L6 ("No" in ST124), the temporal change discrimination portion 33 discriminates that the input signal s1 is a voice signal (ST126). The temporal change discrimination portion 33 outputs a discrimination result to the logical-sum calculating portion 35 (ST127).

Figure 16:
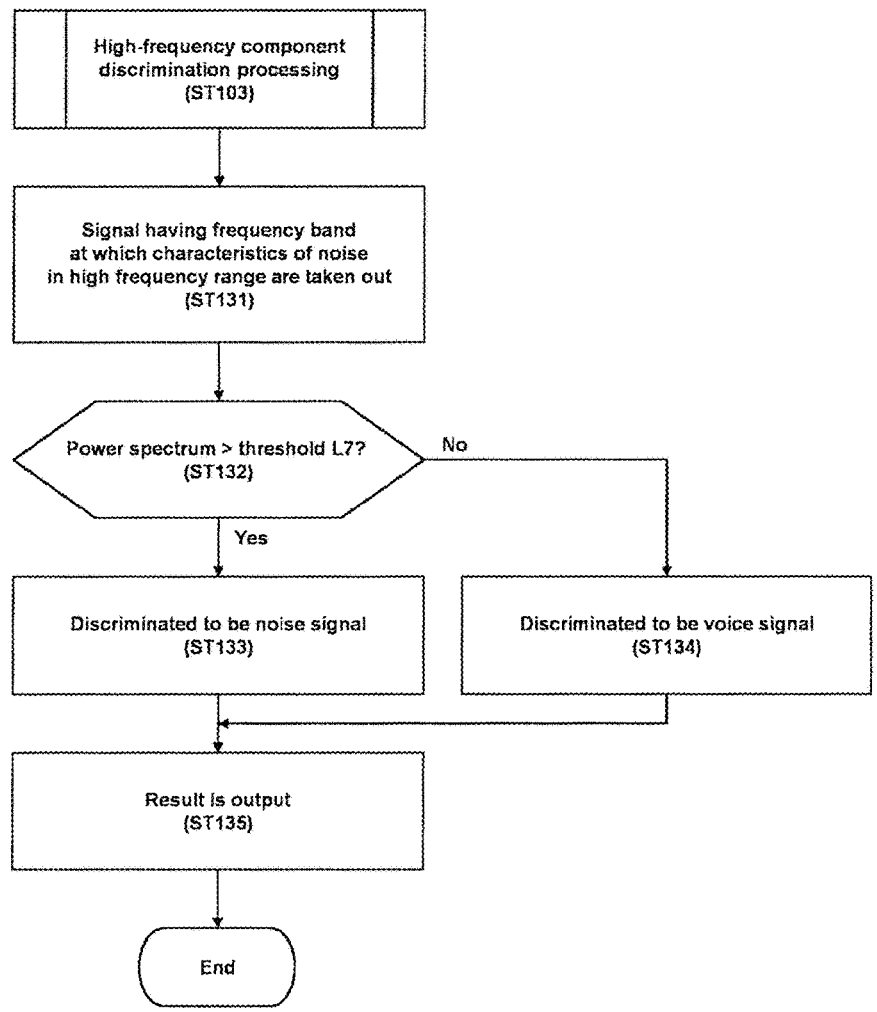
FIG. 16 is a flowchart of high-frequency component discrimination processing of FIG. 13.

FIG. 16 is a flowchart of the high-frequency component discrimination processing (ST104).

The high-frequency component discrimination processing (ST104) is processing for detecting noise great in variation particularly in a high frequency range. The high-frequency component discrimination processing (ST104) is carried out by the high-frequency component discrimination portion 34.

The third filter portion takes out from the input signal s1 a signal having a frequency band at which characteristics of noise in a high frequency range appear (ST131).

Next, the fourth comparison portion 34c compares a power spectrum of the signal having a frequency band at which characteristics of noise in a high frequency range appear with the predetermined threshold L7 (ST132). When the power spectrum is greater than the threshold L7 ("Yes" in ST132), the high-frequency component discrimination portion 34 discriminates that the input signal s1 is a noise signal (ST133). On the other hand, when the power spectrum is smaller than the threshold L7 ("No" in ST132), the high-frequency component discrimination portion 34 discriminates that the input signal s1 is a voice signal (ST134). The high-frequency component discrimination portion 34 outputs a discrimination result to the logical-sum computing portion 15 (ST135).

Referring now back to FIG. 13, the logical-sum calculating portion 35 calculates a logical sum of the discrimination result of the frequency component discrimination processing (ST101), the discrimination result of the temporal change discrimination processing (ST102) and the discrimination result of the high-frequency component discrimination processing (ST103), and then determines whether the input signal s1 is a noise signal or a voice signal based on the logical sum (ST104).

The logical-sum calculating portion 35 determines that the input signal s1 is a noise signal (ST105) when any one of the discrimination result of the frequency component discrimination processing (ST101), the discrimination result of the temporal change discrimination processing (ST102) and the discrimination result of the high-frequency component discrimination processing (ST103) is the discrimination result of a noise signal ("Yes" in ST104). On the other hand, the logical-sum calculating portion 35 determines that the input signal s1 is a voice signal (ST106) when the discrimination result of the frequency component discrimination processing (ST101), the discrimination result of the temporal change discrimination processing (ST102) and the discrimination result of the high-frequency component discrimination processing (ST103) are all the discrimination results of a voice signal ("No" in ST104).

The noise detector 30 inputs a determination result, for example, to a circuit which restricts the output of a voice signal (ST107).

Figure 17:
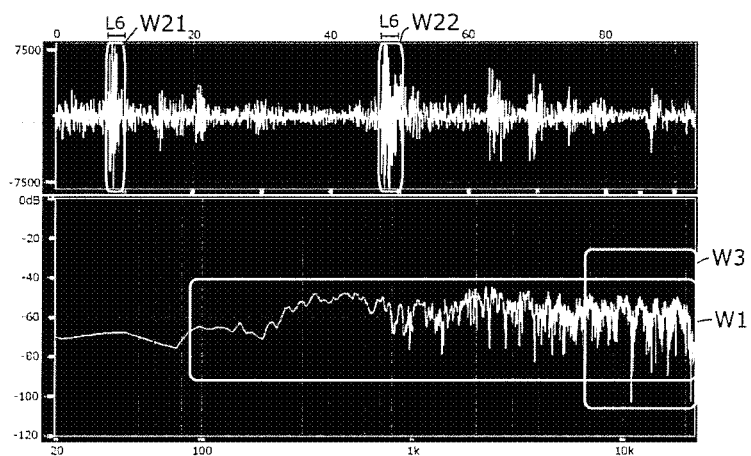
FIG. 17 is a waveform chart which shows one example of waveforms of an input signal input in the noise detector of FIG. 9.

FIG. 17 is a waveform chart which shows one example of waveforms of the input signal s1.

FIG. 17 shows one example of waveforms of the input signal s1 coming from sound caused by crumpling paper as an example of composite noise which contains impulse noise and noise in a high frequency range. An upper graph of the FIG. 17 shows a time-base waveform of sound caused by crumpling paper, in which the vertical axis corresponds to a signal level and the horizontal axis corresponds to time. A lower graph of the FIG. 17 shows a power spectrum of sound caused by crumpling paper, in which the vertical axis corresponds to a signal level and the horizontal axis corresponds to a frequency. Regions enclosed by frames in the FIG. 17 individually show a region W1 subjected to the frequency component discrimination processing (ST101), regions W21, W22 subjected to the temporal change discrimination processing (ST102) and a region W3 subjected to the high-frequency component discrimination processing (ST103).

In the region W1 and the region W3, a power spectrum shown in FIG. 17 has a waveform equal in level from a low frequency range to a high frequency range and also undergoes a great variation in a high frequency range. Thus, the input signal s1 having the power spectrum shown in FIG. 17 is discriminated to be a noise signal by the frequency component discrimination portion 32 and the high-frequency component discrimination portion 34.

The time-base waveform of impulse noise shown in region W21 is attenuated at a short period of time. On the other hand, the time-base waveform of impulse noise shown in the region W22 is attenuated at a relatively long period of time. A count value of the region W21 is smaller than the threshold L6. A count value of the region W22 is greater than the threshold L6. Thus, the input signal s1 having the time-base waveform shown in FIG. 17 is discriminated to be a noise signal from the count value of the region W21 by the temporal change discrimination portion 33.

As described above, the noise detector 30 includes combination of the frequency component discrimination portion 32, the temporal change discrimination portion 33 and the high-frequency component discrimination portion 34, thus is able to detect with high accuracy composite noise which contains impulse noise and noise in a high frequency range.

Synopsis

According to the embodiment described above, the noise detector 30 includes the frequency component discrimination portion 32, the temporal change discrimination portion 33 and the high-frequency component discrimination portion 34, thereby detecting noise based on these individual discrimination results. Thus, the noise detector 30 according to the present embodiment is able to detect with high accuracy composite noise which assumes various forms.

In the embodiment described above, the noise discrimination portion includes three discrimination portions which are the frequency component discrimination portion 32, the temporal change discrimination portion 33 and the high-frequency component discrimination portion 34. However, a configuration of the noise discrimination portion is not limited to the present embodiment. That is, the noise discrimination portion may configured with at least any two of three discrimination portions which are the frequency component discrimination portion, the temporal change discrimination portion and the high-frequency component discrimination portion.

The invention claimed is:

1. A noise detector for detecting noise contained in an input signal, the noise detector comprising:
a noise discrimination portion having a plurality of discrimination portions to which the input signal is input, and
a noise determination portion determining the noise based on individual discrimination results of the plurality of discrimination portions, wherein
the noise discrimination portion comprises
a frequency component discrimination portion discriminating the presence or absence of the noise based on a frequency component of the input signal, and
at least one of a temporal change discrimination portion discriminating the presence or absence of the noise based on a temporal change of the input signal and a high-frequency component discrimination portion discriminating the presence or absence of the noise based on a high-frequency component of the input signal,
the noise determination portion determines the noise based on a logical sum of individual discrimination results of the plurality of discrimination portions,
the frequency component discrimination portion comprises a first filter portion and a second filter portion,
the frequency component discrimination portion is configured to
with the first and second filter portions, divide a whole power spectrum of the input signal into a first part power spectrum and a second part power spectrum, wherein the first part power spectrum is of a first frequency band containing frequencies at which characteristics of voice appear and the second part power spectrum is of a second frequency band containing frequencies at which characteristics of noise appear, and
compare the first and second part power spectra to discriminate whether the input signal is a voice signal or a noise signal.

2. A sound signal output device comprising:
an input portion to which output of a microphone is input,
an input signal discrimination portion discriminating the presence or absence of an input signal from the input portion,
a noise detecting portion detecting noise contained in the input signal, and
a controller controlling output of the input signal based on a discrimination result of the input signal discrimination portion and a detection result of the noise detecting portion, wherein
the noise detecting portion is the noise detector according to claim 1.

3. The sound signal output device according to claim 2, further comprising:
a delay portion delaying the input signal input from the input portion and outputting the input signal as a delayed signal, and
an exchange portion being input the delayed signal from the delay portion and the input signal from the input portion and outputting one of the delayed signal and the input signal.

4. The sound signal output device according to claim 3, further comprising:
an output portion outputting the delayed signal or the input signal input from the exchange portion as an output signal, wherein
the output portion does not output the output signal when the noise detecting portion detects the noise.

5. The sound signal output device according to claim 4, wherein the controller controls output of the output signal from the output portion.

6. The sound signal output device according to claim 4, wherein the exchange portion inputs one of the delayed signal and the input signal to the output portion based on a discrimination result of the input signal discrimination portion.

7. The sound signal output device according to claim 4, wherein the exchange portion inputs an input signal from the input portion to the output portion when the input signal discrimination portion discriminates the absence of an input signal from the input portion.

* * * * *